United States Patent
Hoermann et al.

(10) Patent No.: US 11,304,288 B2
(45) Date of Patent: Apr. 12, 2022

(54) PLASMA TORCH DESIGN

(71) Applicant: Monolith Materials, Inc.

(72) Inventors: Alexander F. Hoermann, Menlo Park, CA (US); Peter L. Johnson, Mountain View, CA (US); Nils Severin Myklebust, Trondheim (NO); Magne Mathisen Nordvik, Kristiansand S. (NO)

(73) Assignee: Monolith Materials, Inc., Lincoln, NE (US)

(*) Notice: Subject to any disclaimer, the term of this patent is extended or adjusted under 35 U.S.C. 154(b) by 0 days.

(21) Appl. No.: 14/610,299

(22) Filed: Jan. 30, 2015

(65) Prior Publication Data
US 2015/0223314 A1 Aug. 6, 2015

Related U.S. Application Data

(60) Provisional application No. 61/934,184, filed on Jan. 31, 2014.

(51) Int. Cl.
*H05H 1/34* (2006.01)
*H05H 1/42* (2006.01)
*C09C 1/48* (2006.01)
*H05H 1/40* (2006.01)

(52) U.S. Cl.
CPC ............... *H05H 1/34* (2013.01); *C09C 1/485* (2013.01); *H05H 2001/3431* (2013.01); *H05H 2001/3484* (2013.01)

(58) Field of Classification Search
None
See application file for complete search history.

(56) References Cited

U.S. PATENT DOCUMENTS

| | | |
|---|---|---|
| 1,339,225 A | 5/1920 | Rose |
| 1,536,612 A | 5/1925 | Lewis |
| 1,597,277 A | 8/1926 | Jakowsky |
| 2,002,003 A | 5/1935 | Eisenhut et al. |
| 2,039,312 A | 5/1936 | Goldman |
| 2,062,358 A | 12/1936 | Frolich |
| 2,393,106 A | 1/1946 | Johnson et al. |
| 2,557,143 A | 6/1951 | Royster |
| 2,572,851 A | 10/1951 | Gardner et al. |
| 2,603,669 A | 7/1952 | Chappell |

(Continued)

FOREIGN PATENT DOCUMENTS

| | | |
|---|---|---|
| AU | 28970/71 A | 11/1972 |
| CA | 830378 A | 12/1969 |

(Continued)

OTHER PUBLICATIONS

Search Report from P.C.T., dated Jun. 19, 2015.

(Continued)

*Primary Examiner* — Xiuyu Tai
(74) *Attorney, Agent, or Firm* — Wilson Sousini Goodrich & Rosati

(57) ABSTRACT

Design advances for improving the performance of a plasma torch. The use of one or more of various advances described herein can improve the efficiency and effectiveness of the torch, the reactor and the manufacturing process. The use of the torch with hydrogen plasma gas, natural gas feedstock, and carbon black production are also described.

18 Claims, 4 Drawing Sheets

(56) References Cited

U.S. PATENT DOCUMENTS

| | | |
|---|---|---|
| 2,603,699 A | 7/1952 | Chappel |
| 2,616,842 A | 11/1952 | Sheer et al. |
| 2,785,964 A | 3/1957 | Pollock |
| 2,850,403 A | 9/1958 | Day |
| 2,851,403 A | 9/1958 | Hale |
| 2,897,071 A | 7/1959 | Gilbert |
| 2,951,143 A | 8/1960 | Anderson et al. |
| 3,009,783 A | 11/1961 | Sheer et al. |
| 3,073,769 A | 1/1963 | Doukas |
| 3,127,536 A | 3/1964 | McLane |
| 3,253,890 A | 5/1966 | De et al. |
| 3,288,696 A | 11/1966 | Orbach |
| 3,307,923 A | 3/1967 | Ruble |
| 3,308,164 A | 3/1967 | Shepard |
| 3,309,780 A | 3/1967 | Goins |
| 3,331,664 A | 7/1967 | Jordan |
| 3,342,554 A | 9/1967 | Jordan et al. |
| 3,344,051 A | 9/1967 | Latham, Jr. |
| 3,408,164 A | 10/1968 | Johnson |
| 3,409,403 A | 11/1968 | Bjornson et al. |
| 3,420,632 A | 1/1969 | Ryan |
| 3,431,074 A | 3/1969 | Jordan |
| 3,453,488 A | 7/1969 | Cann et al. |
| 3,464,793 A | 9/1969 | Jordan et al. |
| 3,619,138 A | 11/1971 | Gunnell |
| 3,619,140 A | 11/1971 | Morgan et al. |
| 3,637,974 A | 1/1972 | Tajbl et al. |
| 3,673,375 A | 6/1972 | Camacho |
| 3,725,103 A | 4/1973 | Jordan et al. |
| 3,922,335 A | 11/1975 | Jordan et al. |
| 3,981,654 A | 9/1976 | Rood et al. |
| 3,981,659 A | 9/1976 | Myers |
| 3,984,743 A | 10/1976 | Horie |
| 3,998,934 A | 12/1976 | Vanderveen |
| 4,028,072 A | 6/1977 | Braun et al. |
| 4,035,336 A | 7/1977 | Jordan et al. |
| 4,057,396 A | 11/1977 | Matovich |
| 4,075,160 A | 2/1978 | Mills et al. |
| 4,088,741 A | 5/1978 | Takewell |
| 4,101,639 A | 7/1978 | Surovikin et al. |
| 4,138,471 A | 2/1979 | Lamond et al. |
| 4,199,545 A | 4/1980 | Matovich |
| 4,282,199 A | 8/1981 | Lamond et al. |
| 4,289,949 A | 9/1981 | Raaness et al. |
| 4,292,291 A | 9/1981 | Rothbuhr et al. |
| 4,317,001 A | 2/1982 | Silver et al. |
| 4,372,937 A | 2/1983 | Johnson |
| 4,404,178 A | 9/1983 | Johnson et al. |
| 4,431,624 A | 2/1984 | Casperson |
| 4,452,771 A | 6/1984 | Hunt |
| 4,472,172 A | 9/1984 | Sheer et al. |
| 4,543,470 A | 9/1985 | Santen et al. |
| 4,553,981 A | 11/1985 | Fuderer |
| 4,577,461 A | 3/1986 | Cann |
| 4,601,887 A | 7/1986 | Dorn et al. |
| 4,678,888 A | 7/1987 | Camacho et al. |
| 4,689,199 A | 8/1987 | Eckert et al. |
| 4,755,371 A | 7/1988 | Dickerson |
| 4,765,964 A | 8/1988 | Gravley et al. |
| 4,787,320 A | 11/1988 | Raaness et al. |
| 4,864,096 A | 9/1989 | Wolf et al. |
| 4,977,305 A | 12/1990 | Severance, Jr. |
| 5,039,312 A | 8/1991 | Hollis, Jr. et al. |
| 5,045,667 A | 9/1991 | Iceland et al. |
| 5,046,145 A | 9/1991 | Drouet |
| 5,105,123 A | 4/1992 | Ballou |
| 5,147,998 A | 9/1992 | Tsantrizos et al. |
| 5,206,880 A | 4/1993 | Olsson |
| 5,222,448 A * | 6/1993 | Morgenthaler .......... A62D 3/19 |
| | | 110/346 |
| 5,352,289 A | 10/1994 | Weaver et al. |
| 5,399,957 A | 3/1995 | Vierboom et al. |
| 5,427,762 A | 6/1995 | Steinberg et al. |
| 5,476,826 A | 12/1995 | Greenwald et al. |
| 5,481,080 A | 1/1996 | Lynum et al. |
| 5,486,674 A | 1/1996 | Lynum et al. |
| 5,500,501 A | 3/1996 | Lynum et al. |
| 5,527,518 A | 6/1996 | Lynum et al. |
| 5,593,644 A | 1/1997 | Norman et al. |
| 5,604,424 A | 2/1997 | Shuttleworth |
| 5,611,947 A | 3/1997 | Vavruska |
| 5,673,285 A | 9/1997 | Wittle et al. |
| 5,717,293 A | 2/1998 | Sellers |
| 5,725,616 A | 3/1998 | Lynum et al. |
| 5,749,937 A | 5/1998 | Detering et al. |
| 5,935,293 A * | 8/1999 | Detering ................ B01J 19/088 |
| | | 420/590 |
| 5,951,960 A | 9/1999 | Lynum et al. |
| 5,989,512 A | 11/1999 | Lynum et al. |
| 5,997,837 A | 12/1999 | Lynum et al. |
| 6,058,133 A * | 5/2000 | Bowman ................ H05B 7/085 |
| | | 313/44 |
| 6,068,827 A | 5/2000 | Lynum et al. |
| 6,099,696 A | 8/2000 | Schwob et al. |
| 6,188,187 B1 | 2/2001 | Harlan |
| 6,197,274 B1 | 3/2001 | Mahmud et al. |
| 6,277,350 B1 | 8/2001 | Gerspacher |
| 6,358,375 B1 | 3/2002 | Schwob |
| 6,380,507 B1 | 4/2002 | Childs |
| 6,395,197 B1 | 5/2002 | Detering et al. |
| 6,403,697 B1 | 6/2002 | Mitsunaga et al. |
| 6,441,084 B1 | 8/2002 | Lee et al. |
| 6,442,950 B1 | 9/2002 | Tung |
| 6,444,727 B1 | 9/2002 | Yamada et al. |
| 6,602,920 B2 | 8/2003 | Hall et al. |
| 6,703,580 B2 | 3/2004 | Brunet et al. |
| 6,773,689 B1 | 8/2004 | Lynum et al. |
| 6,955,707 B2 | 10/2005 | Ezell et al. |
| 7,167,240 B2 | 1/2007 | Stagg |
| 7,294,314 B2 | 11/2007 | Graham |
| 7,312,415 B2 | 12/2007 | Ohmi et al. |
| 7,360,309 B2 | 4/2008 | Vaidyanathan et al. |
| 7,431,909 B1 | 10/2008 | Rumpf et al. |
| 7,452,514 B2 | 11/2008 | Fabry et al. |
| 7,462,343 B2 | 12/2008 | Lynum et al. |
| 7,563,525 B2 | 7/2009 | Ennis |
| 7,582,184 B2 | 9/2009 | Tomita et al. |
| 7,623,340 B1 | 11/2009 | Song et al. |
| 7,635,824 B2 | 12/2009 | Miki et al. |
| 7,655,209 B2 | 2/2010 | Rumpf et al. |
| 7,777,151 B2 | 8/2010 | Kuo |
| 7,847,009 B2 | 12/2010 | Wong et al. |
| 7,968,191 B2 | 6/2011 | Hampden-Smith et al. |
| 8,147,765 B2 | 4/2012 | Muradov et al. |
| 8,221,689 B2 | 7/2012 | Boutot et al. |
| 8,257,452 B2 | 9/2012 | Menzel |
| 8,277,739 B2 | 10/2012 | Monsen et al. |
| 8,323,793 B2 | 12/2012 | Hamby et al. |
| 8,443,741 B2 | 5/2013 | Chapman et al. |
| 8,471,170 B2 | 6/2013 | Li et al. |
| 8,486,364 B2 | 7/2013 | Vanier et al. |
| 8,501,148 B2 | 8/2013 | Belmont et al. |
| 8,581,147 B2 | 11/2013 | Kooken et al. |
| 8,710,136 B2 | 4/2014 | Yurovskaya et al. |
| 8,771,386 B2 | 7/2014 | Licht et al. |
| 8,784,617 B2 | 7/2014 | Novoselov et al. |
| 8,850,826 B2 | 10/2014 | Ennis |
| 8,871,173 B2 | 10/2014 | Nester et al. |
| 8,911,596 B2 | 12/2014 | Vancina |
| 9,095,835 B2 | 8/2015 | Skoptsov et al. |
| 9,229,396 B1 | 1/2016 | Wu et al. |
| 9,315,735 B2 | 4/2016 | Cole et al. |
| 9,445,488 B2 | 9/2016 | Foret |
| 9,574,086 B2 | 2/2017 | Johnson et al. |
| 9,679,750 B2 | 6/2017 | Choi et al. |
| 10,100,200 B2 | 10/2018 | Johnson et al. |
| 10,138,378 B2 | 11/2018 | Hoermman et al. |
| 10,370,539 B2 | 8/2019 | Johnson et al. |
| 10,808,097 B2 | 10/2020 | Hardman et al. |
| 2001/0029888 A1 | 10/2001 | Sindarrajan et al. |
| 2001/0039797 A1 | 11/2001 | Cheng |
| 2002/0000085 A1 | 1/2002 | Hall et al. |
| 2002/0050323 A1 * | 5/2002 | Moisan ................ B01D 53/32 |
| | | 156/345.41 |

(56) References Cited

U.S. PATENT DOCUMENTS

| | | |
|---|---|---|
| 2002/0051903 A1 | 5/2002 | Masuko et al. |
| 2002/0141476 A1* | 10/2002 | Varela ............... H05B 7/14 373/92 |
| 2002/0157559 A1 | 10/2002 | Brunet et al. |
| 2003/0103858 A1 | 6/2003 | Baran et al. |
| 2003/0152184 A1 | 8/2003 | Shehane et al. |
| 2004/0047779 A1 | 3/2004 | Denison |
| 2004/0071626 A1 | 4/2004 | Smith et al. |
| 2004/0081609 A1 | 4/2004 | Green et al. |
| 2004/0081862 A1 | 4/2004 | Herman |
| 2004/0148860 A1 | 8/2004 | Fletcher |
| 2004/0168904 A1 | 9/2004 | Anazawa et al. |
| 2004/0211760 A1 | 10/2004 | Delzenne et al. |
| 2004/0213728 A1 | 10/2004 | Kopietz et al. |
| 2004/0216559 A1 | 11/2004 | Kim et al. |
| 2004/0247509 A1 | 12/2004 | Newby |
| 2005/0063892 A1 | 3/2005 | Tandon et al. |
| 2005/0063893 A1 | 3/2005 | Ayala et al. |
| 2005/0079119 A1 | 4/2005 | Kawakami et al. |
| 2005/0230240 A1 | 10/2005 | Dubrovsky et al. |
| 2006/0034748 A1 | 2/2006 | Lewis et al. |
| 2006/0037244 A1 | 2/2006 | Clawson |
| 2006/0068987 A1 | 3/2006 | Bollepalli et al. |
| 2006/0107789 A1 | 5/2006 | Deegan et al. |
| 2006/0155157 A1 | 7/2006 | Zarrinpashne et al. |
| 2006/0226538 A1 | 10/2006 | Kawata |
| 2006/0239890 A1 | 10/2006 | Chang et al. |
| 2007/0140004 A1 | 6/2007 | Marotta et al. |
| 2007/0183959 A1 | 8/2007 | Charlier et al. |
| 2007/0270511 A1 | 11/2007 | Melnichuk et al. |
| 2007/0293405 A1 | 12/2007 | Zhang et al. |
| 2008/0041829 A1 | 2/2008 | Blutke et al. |
| 2008/0121624 A1 | 5/2008 | Belashchenko et al. |
| 2008/0159947 A1 | 7/2008 | Yurovskaya et al. |
| 2008/0169183 A1 | 7/2008 | Hertel et al. |
| 2008/0182298 A1 | 7/2008 | Day |
| 2008/0226538 A1 | 9/2008 | Rumpf et al. |
| 2008/0233402 A1 | 9/2008 | Carlson et al. |
| 2008/0279749 A1 | 11/2008 | Probst et al. |
| 2008/0292533 A1 | 11/2008 | Belmont et al. |
| 2009/0014423 A1 | 1/2009 | Li et al. |
| 2009/0035469 A1 | 2/2009 | Sue et al. |
| 2009/0090282 A1 | 4/2009 | Gold et al. |
| 2009/0142250 A1 | 6/2009 | Fabry et al. |
| 2009/0155157 A1 | 6/2009 | Stenger et al. |
| 2009/0173252 A1 | 7/2009 | Nakata et al. |
| 2009/0208751 A1 | 8/2009 | Green et al. |
| 2009/0230098 A1 | 9/2009 | Salsich et al. |
| 2010/0147188 A1 | 6/2010 | Mamak et al. |
| 2010/0249353 A1 | 9/2010 | Macintosh et al. |
| 2011/0036014 A1 | 2/2011 | Tsangaris et al. |
| 2011/0071692 A1 | 3/2011 | D'Amato et al. |
| 2011/0071962 A1 | 3/2011 | Lim |
| 2011/0076608 A1 | 3/2011 | Bergemann et al. |
| 2011/0120137 A1 | 5/2011 | Ennis |
| 2011/0138766 A1 | 6/2011 | Elkady et al. |
| 2011/0155703 A1 | 6/2011 | Winn |
| 2011/0180513 A1 | 7/2011 | Luhrs et al. |
| 2011/0239542 A1 | 10/2011 | Liu et al. |
| 2012/0018402 A1 | 1/2012 | Carducci et al. |
| 2012/0025693 A1 | 2/2012 | Wang et al. |
| 2012/0201266 A1 | 8/2012 | Boulos et al. |
| 2012/0232173 A1 | 9/2012 | Juranitch et al. |
| 2012/0292794 A1 | 11/2012 | Prabhu et al. |
| 2013/0039841 A1 | 2/2013 | Nester et al. |
| 2013/0062195 A1 | 3/2013 | Samaranayake et al. |
| 2013/0062196 A1 | 3/2013 | Sin |
| 2013/0092525 A1 | 4/2013 | Li et al. |
| 2013/0105739 A1 | 5/2013 | Bingue et al. |
| 2013/0194840 A1 | 8/2013 | Huselstein et al. |
| 2013/0292363 A1 | 11/2013 | Hwang et al. |
| 2013/0323614 A1 | 12/2013 | Chapman et al. |
| 2013/0340651 A1 | 12/2013 | Wampler et al. |
| 2014/0000488 A1 | 1/2014 | Sekiyama et al. |
| 2014/0057166 A1 | 2/2014 | Yokoyama et al. |
| 2014/0131324 A1 | 5/2014 | Shipulski et al. |
| 2014/0151601 A1 | 6/2014 | Hyde et al. |
| 2014/0166496 A1 | 6/2014 | Lin et al. |
| 2014/0190179 A1 | 7/2014 | Barker et al. |
| 2014/0224706 A1 | 8/2014 | Do et al. |
| 2014/0227165 A1 | 8/2014 | Hung et al. |
| 2014/0248442 A1 | 9/2014 | Luizi et al. |
| 2014/0290532 A1 | 10/2014 | Rodriguez et al. |
| 2014/0294716 A1 | 10/2014 | Susekov et al. |
| 2014/0339478 A1 | 11/2014 | Probst et al. |
| 2014/0345828 A1 | 11/2014 | Ehmann et al. |
| 2014/0357092 A1 | 12/2014 | Singh |
| 2014/0373752 A2 | 12/2014 | Hassinen et al. |
| 2015/0004516 A1 | 1/2015 | Kim et al. |
| 2015/0044105 A1 | 2/2015 | Novoselov |
| 2015/0044516 A1 | 2/2015 | Kyrlidis et al. |
| 2015/0056516 A1 | 2/2015 | Hellring et al. |
| 2015/0064099 A1 | 3/2015 | Nester et al. |
| 2015/0180346 A1 | 6/2015 | Yuzurihara et al. |
| 2015/0210856 A1* | 7/2015 | Johnson ............... C09C 1/485 423/449.1 |
| 2015/0210857 A1 | 7/2015 | Johnson et al. |
| 2015/0210858 A1 | 7/2015 | Hoermann et al. |
| 2015/0211378 A1 | 7/2015 | Johnson et al. |
| 2015/0217940 A1 | 8/2015 | Si et al. |
| 2015/0218383 A1 | 8/2015 | Johnson et al. |
| 2015/0223314 A1 | 8/2015 | Hoermann et al. |
| 2015/0252168 A1 | 9/2015 | Schuck et al. |
| 2016/0030856 A1 | 2/2016 | Kaplan et al. |
| 2016/0210856 A1 | 7/2016 | Assenbaum et al. |
| 2016/0243518 A1 | 8/2016 | Spitzl |
| 2016/0293959 A1 | 10/2016 | Blizanac et al. |
| 2017/0034898 A1 | 2/2017 | Moss et al. |
| 2017/0037253 A1 | 2/2017 | Hardman et al. |
| 2017/0058128 A1 | 3/2017 | Johnson et al. |
| 2017/0066923 A1 | 3/2017 | Hardman et al. |
| 2017/0073522 A1 | 3/2017 | Hardman et al. |
| 2017/0349758 A1 | 12/2017 | Johnson |
| 2018/0015438 A1 | 1/2018 | Taylor et al. |
| 2018/0016441 A1 | 1/2018 | Taylor et al. |
| 2018/0022925 A1 | 1/2018 | Hardman et al. |
| 2019/0048200 A1 | 2/2019 | Johnson et al. |
| 2019/0100658 A1 | 4/2019 | Taylor et al. |
| 2019/0153234 A1 | 5/2019 | Hoermann et al. |
| 2019/0338139 A1 | 11/2019 | Hoermann et al. |
| 2020/0140691 A1 | 5/2020 | Johnson et al. |
| 2020/0291237 A1 | 9/2020 | Hardman et al. |
| 2021/0017025 A1 | 1/2021 | Hardman |
| 2021/0017031 A1 | 1/2021 | Hardman et al. |
| 2021/0020947 A1 | 1/2021 | Hardman et al. |

FOREIGN PATENT DOCUMENTS

| | | |
|---|---|---|
| CA | 964 405 A1 | 3/1975 |
| CA | 2 353 752 A1 | 1/2003 |
| CA | 2 621 749 A1 | 8/2009 |
| CN | 86104761 A | 2/1987 |
| CN | 1059541 A | 3/1992 |
| CN | 1076206 A | 9/1993 |
| CN | 1077329 A | 10/1993 |
| CN | 1078727 A | 11/1993 |
| CN | 1086527 A | 5/1994 |
| CN | 1196032 A | 10/1998 |
| CN | 1398780 A | 2/2003 |
| CN | 1458966 A | 11/2003 |
| CN | 1644650 A | 7/2005 |
| CN | 101092691 A | 12/2007 |
| CN | 101193817 A | 6/2008 |
| CN | 101198442 A | 6/2008 |
| CN | 201087175 Y | 7/2008 |
| CN | 101368010 A | 2/2009 |
| CN | 101657283 A | 2/2010 |
| CN | 101734620 A | 6/2010 |
| CN | 102007186 A | 4/2011 |
| CN | 102060281 A | 5/2011 |
| CN | 102108216 A | 6/2011 |
| CN | 102186767 A | 9/2011 |
| CN | 102350506 A | 2/2012 |
| CN | 102612549 A | 7/2012 |

(56) References Cited

FOREIGN PATENT DOCUMENTS

| | | |
|---|---|---|
| CN | 102666686 A | 9/2012 |
| CN | 202610344 U | 12/2012 |
| CN | 102869730 A | 1/2013 |
| CN | 102993788 A | 3/2013 |
| CN | 103108831 A | 5/2013 |
| CN | 103160149 A | 6/2013 |
| CN | 103391678 A | 11/2013 |
| CN | 203269847 U | 11/2013 |
| CN | 203415580 U | 1/2014 |
| CN | 204301483 U | 4/2015 |
| CN | 105070518 A | 11/2015 |
| CN | 105073906 A | 11/2015 |
| CN | 205472672 U | 8/2016 |
| DE | 211457 A3 | 7/1984 |
| DE | 198 07 224 A1 | 8/1999 |
| EA | 200300389 | 12/2003 |
| EP | 0315442 A2 | 5/1989 |
| EP | 0325689 A1 | 8/1989 |
| EP | 0 616 600 A1 | 9/1994 |
| EP | 0 635 044 B1 | 2/1996 |
| EP | 0 635 043 B1 | 6/1996 |
| EP | 0 861 300 A1 | 9/1998 |
| EP | 0982378 A1 | 3/2000 |
| EP | 1088854 A2 | 4/2001 |
| EP | 1188801 A1 | 3/2002 |
| EP | 3592810 A1 | 1/2020 |
| FR | 1249094 A | 12/1960 |
| FR | 2 891 434 A1 | 3/2007 |
| FR | 2 937 029 A1 | 4/2010 |
| GB | 395893 | 7/1933 |
| GB | 987498 | 3/1965 |
| GB | 1068519 | 5/1967 |
| GB | 1 400 266 A | 7/1975 |
| GB | 1 492 346 A | 11/1977 |
| GB | 2419883 A | 5/2006 |
| JP | S5021983 B1 | 7/1975 |
| JP | S5987800 A | 5/1984 |
| JP | H04228270 A | 8/1992 |
| JP | H06302527 A | 10/1994 |
| JP | 6-322615 A | 11/1994 |
| JP | H07307165 A | 11/1995 |
| JP | H08319552 A | 12/1996 |
| JP | H09316645 A | 12/1997 |
| JP | H11123562 A | 5/1999 |
| JP | 2001253974 A | 9/2001 |
| JP | 2004-300334 A | 10/2004 |
| JP | 2005-243410 A | 9/2005 |
| JP | 2005235709 A | 9/2005 |
| KR | 10-2008-105344 A | 12/2008 |
| KR | 2014-0075261 A | 6/2014 |
| RU | 2425795 | 8/2011 |
| RU | 2488984 | 7/2013 |
| TW | 200418933 A | 10/2004 |
| WO | WO-9204415 A1 | 3/1992 |
| WO | 93/12031 | 6/1993 |
| WO | WO-9312633 A1 | 6/1993 |
| WO | 93/18094 A1 | 9/1993 |
| WO | 93/20153 A1 | 10/1993 |
| WO | WO-9320152 A1 | 10/1993 |
| WO | 93/23331 A1 | 11/1993 |
| WO | 1994/008747 A1 | 4/1994 |
| WO | 97/03133 | 1/1997 |
| WO | WO-9813428 A1 | 4/1998 |
| WO | WO-0018682 A1 | 4/2000 |
| WO | WO-0224819 A1 | 3/2002 |
| WO | 03014018 A1 | 2/2003 |
| WO | WO-2004083119 A1 | 9/2004 |
| WO | WO-2005054378 A1 | 6/2005 |
| WO | WO-2010040840 A2 | 4/2010 |
| WO | WO-2010059225 A1 | 5/2010 |
| WO | 2012/015313 A1 | 2/2012 |
| WO | 2012/067546 A2 | 5/2012 |
| WO | 2012/094743 A1 | 7/2012 |
| WO | 2012/149170 A1 | 11/2012 |
| WO | 2013/134093 A1 | 9/2013 |
| WO | 2013/184074 A1 | 12/2013 |
| WO | 2013/185219 A1 | 12/2013 |
| WO | 2014/000108 A1 | 1/2014 |
| WO | 2014/012169 A1 | 1/2014 |
| WO | WO-2014149455 A1 | 9/2014 |
| WO | 2015/049008 A1 | 4/2015 |
| WO | WO-2015051893 A1 | 4/2015 |
| WO | WO-2015093947 A1 | 6/2015 |
| WO | 2015/116797 A1 | 8/2015 |
| WO | 2015/116798 A1 | 8/2015 |
| WO | 2015/116800 A1 | 8/2015 |
| WO | 2015/116807 A1 | 8/2015 |
| WO | 2015/116811 A1 | 8/2015 |
| WO | 2015/116943 A2 | 8/2015 |
| WO | 2016/012367 A1 | 1/2016 |
| WO | 2016/126598 A1 | 8/2016 |
| WO | 2016/126599 A1 | 8/2016 |
| WO | 2016/126600 A1 | 8/2016 |
| WO | 2016014641 A1 | 8/2016 |
| WO | 2017/019683 A1 | 2/2017 |
| WO | 2017/027385 A1 | 2/2017 |
| WO | 2017/034980 A1 | 3/2017 |
| WO | 2017/044594 A1 | 3/2017 |
| WO | 2017/048621 A1 | 3/2017 |
| WO | 2017/190015 A1 | 11/2017 |
| WO | 2017/190045 A1 | 11/2017 |
| WO | WO-2018165483 A1 | 9/2018 |
| WO | WO-2018195460 A1 | 10/2018 |
| WO | WO-2019046320 A1 | 3/2019 |
| WO | WO-2019046322 A1 | 3/2019 |
| WO | WO-2019046324 A1 | 3/2019 |
| WO | WO-2019084200 A1 | 5/2019 |
| WO | WO-2019195461 A1 | 10/2019 |

OTHER PUBLICATIONS

Europe Office Action conducted in counterpart Europe Appln. No. 15 74 2910 (dated Jul. 18, 2017).

ISR and Written Opinion from PCT/US2015/013482, dated Jun. 17, 2015.

ISR and Written Opinion from PCT/US2015/013505, dated May 11, 2015.

ISR and Written Opinion from PCT/US2015/013794, dated Jun. 19, 2015.

Donnet, Basal and Wang, "Carbon Black", New York: Marcel Dekker, 1993 pp. 46, 47 and 54.

Boehm, HP, "Some Aspects of Surface Chemistry of Carbon Blacks and Other Carbons", Carbon 1994, p. 759.

"The Science and Technology of Rubber" (Mark, Erman, and Roland, Fourth Edition, Academic Press, 2013).

"Carbon Black Elastomer Interaction" Rubber Chemistry and Technology, 1991, pp. 19-39.

"The Impact of a Fullerene-Like Concept in Carbon Black Science", Carbon, 2002, pp. 157-162.

ISR and Written Opinion from PCT/US2015/013510, dated Apr. 22, 2015.

ISR and Written Opinion from PCT/US2016/015939, dated Jun. 3, 2016.

ISR and Written Opinion from PCT/US2016/015941, dated Apr. 22, 2016.

ISR and Written Opinion from PCT/US2016/015942, dated Apr. 11, 2016.

ISR and Written Opinion from PCT/US2016/044039, dated Oct. 6, 2016.

ISR and Written Opinion from PCT/US2016/045793, dated Oct. 18, 2016.

ISR and Written Opinion from PCT/US2016/050728, dated Nov. 18, 2016.

ISR and Written Opinion from PCT/US2016/051261, dated Nov. 18, 2016.

ISR and Written Opinion from PCT/US2015/013484, dated Apr. 22, 2015.

Non-Final Office Action dated Mar. 16, 2016 in U.S. Appl. No. 14/591,476.

(56) References Cited

OTHER PUBLICATIONS

Final Office Action dated Jul. 11, 2016 in in U.S. Appl. No. 14/591,476.
Non-Final Office Action dated Mar. 16, 2016 in U.S. Appl. No. 14/591,541.
Final Office Action dated Jul. 14, 2016 in U.S. Appl. No. 14/591,541.
Non-Final Office Action dated Apr. 13, 2016 in U.S. Appl. No. 14/601,761.
Final Office Action dated Oct. 19, 2016 in U.S. Appl. No. 14/601,761.
Non-Final Office Action dated Apr. 13, 2016 in U.S. Appl. No. 14/601,793.
Final Office Action dated Aug. 3, 2016 in U.S. Appl. No. 14/601,793.
Notice of Allowance dated Oct. 7, 2016 in U.S. Appl. No. 14/601,793.
Non-Final Office Action dated Dec. 23, 2016 in U.S. Appl. No. 15/221,088.
AP 42, Fifth Edition, vol. I, Chapter 6: Organic Chemical Process Industry, Section 6.1: Carbon Black.
Fulcheri, et al. "Plasma processing: a step towards the production of new grades of carbon black." Carbon 40.2 (2002): 169-176.
Grivei, et al. A clean process for carbon nanoparticles and hydrogen production from plasma hydrocarbon cracking. Publishable Report, European Commission JOULE III Programme, Project No. JOE3-CT97-0057, circa 2000.
Fabry, et al. "Carbon black processing by thermal plasma. Analysis of the particle formation mechanism." Chemical Engineering Science 56.6 (2001): 2123-2132.
Pristavita, et al. "Carbon nanoparticle production by inductively coupled thermal plasmas: controlling the thermal history of particle nucleation." Plasma Chemistry and Plasma Processing 31.6 (2011): 851-866.
Cho, et al. "Conversion of natural gas to hydrogen and carbon black by plasma and application of plasma black." Symposia—American Chemical Society, Div. Fuel Chem. vol. 49. 2004.
Pristavita, et al. "Carbon blacks produced by thermal plasma: the influence of the reactor geometry on the product morphology." Plasma Chemistry and Plasma Processing 30.2 (2010): 267-279.
Pristavita, et al. "Volatile Compounds Present in Carbon Blacks Produced by Thermal Plasmas." Plasma Chemistry and Plasma Processing 31.6 (2011): 839-850.
Garberg, et al. "A transmission electron microscope and electron diffraction study of carbon nanodisks." Carbon 46.12 (2008): 1535-1543.
Knaapila, et al. "Directed assembly of carbon nanocones into wires with an epoxy coating in thin films by a combination of electric field alignment and subsequent pyrolysis." Carbon 49.10 (2011): 3171-3178.
Krishnan, et al. "Graphitic cones and the nucleation of curved carbon surfaces." Nature 388.6641 (1997): 451-454.
Høyer, et al. "Microelectromechanical strain and pressure sensors based on electric field aligned carbon cone and carbon black particles in a silicone elastomer matrix." Journal of Applied Physics 112.9 (2012): 094324.
Naess, Stine Nalum, et al. "Carbon nanocones: wall structure and morphology." Science and Technology of advanced materials (2016), 7 pages.
Fulcheri, et al. "From methane to hydrogen, carbon black and water." International journal of hydrogen energy 20.3 (1995): 197-202.
ISR and Written Opinion from PCT/US2016/047769, dated Dec. 30, 2016.
D.L. Sun, F. Wang, R.Y. Hong, C.R. Xie, Preparation of carbon black via arc discharge plasma enhanced by thermal pyrolysis, Diamond & Related Materials (2015), doi: 10.1016/j.diamond.2015.11.004, 47 pages.
Non-Final Office Action dated Feb. 22, 2017 in U.S. Appl. No. 14/591,541.
Non-Final Office Action dated May 2, 2017 in U.S. Appl. No. 14/610,299.
Ex Parte Quayke Action dated May 19, 2017 in U.S. Appl. No. 14/601,761.
Extended European Search Report from EP Application No. 15 742 910.1 dated Jul. 18, 2017.
Search report in counterpart European Application No. 15 74 3214 dated Sep. 12, 2017.
ISR and Written Opinion from PCT/US2017/030139, dated Jul. 19, 2017.
ISR and Written Opinion from PCT/US2017/030179, dated Jul. 27, 2017.
A.I. Medalia et al., "Tinting Strength of Carbon Black," Journal of Colloid and Interface Science, vol. 40, No. 2, Aug. 1972.
Reese, J. (2017). Resurgence in American manufacturing will be led by the rubber and tire industry. Rubber World. 255. 18-21 and 23.
Non-Final Office Action dated Feb. 27, 2017 in U.S. Appl. No. 14/591,476.
Extended European Search Report from EP Application No. 15743214.7 dated Jan. 16, 2018.
Chiesa P, Lozza G, Mazzocchi L. Using Hydrogen as Gas Turbine Fuel. ASME. J. Eng. Gas Turbines Power. 2005;127(1):73-80. doi:10.1115/1.1787513.
Tsujikawa, Y., and T. Sawada. "Analysis of a gas turbine and steam turbine combined cycle with liquefied hydrogen as fuel." International Journal of Hydrogen Energy 7.6 (1982): 499-505.
Search report from RU2016135213, dated Feb. 12, 2018.
Non-Final Office Action dated Jan. 16, 2018 in U.S. Appl. No. 14/591,528.
Bakken, Jon Arne, et al. "Thermal plasma process development in Norway." Pure and applied Chemistry 70.6 (1998): 1223-1228.
Polman, E. A., J. C. De Laat, and M. Crowther. "Reduction of CO2 emissions by adding hydrogen to natural gas." IEA Green House Gas R&D programme (2003).
Verfondern, K., "Nuclear Energy for Hydrogen Production", Schriften des Forschungzentrum Julich, vol. 58, 2007.
U.S. Environmental Protection Agency, "Guide to Industrial Assessments for Pollution Prevention and Energy Efficiency," EPA 625/R-99/003, 1999.
Breeze, P. "Raising steam plant efficiency-Pushing the steam cycle boundaries." PEI Magazine 20.4 (2012).
Final Office Action dated Oct. 13, 2017 in U.S. Appl. No. 14/591,476.
Final Office Action dated Oct. 13, 2017 in U.S. Appl. No. 14/591,541.
Notice of Allowance dated Jan. 18, 2018 in U.S. Appl. No. 14/601,761.
Correced Notice of Allowance dated Feb. 9, 2018 in U.S. Appl. No. 14/601,761.
Final Office Action dated Sep. 19, 2017 in U.S. Appl. No. 15/221,088.
Non-Final Office Action dated Jan. 9, 2018 in U.S. Appl. No. 15/259.884.
Russian Official Notification of application No. 2016135213 from Russia dated Feb. 12, 2018.
Non-Final Office Action in U.S. Appl. No. 15/241,771, dated Jul. 6, 2018.
Extended European Search Report from EP Application No. 16747055.8, dated Jun. 27, 2018.
Extended European Search Report from EP Application No. 16747056.6, dated Jun. 27, 2018.
ISR and Written Opinion from PCT/US2018/028619, dated Aug. 9, 2018.
Non-Final Office Action in U.S. Appl. No. 15/221,088, dated Apr. 20, 2018.
ISR and Written Opinion from PCT/US2018/021627, dated May 31, 2018.
Wikipedia "Heating Element" Oct. 14, 2016. p. 1 para[0001]. Retrieved from https://en.wikipedia.org/w/index.php?title=Heating_element&oldid=744277540 on May 9, 2018.
Wikipedia "Joule Heating" Jan. 15, 2017. p. 1 para[0002]. Retrieved from https://en.wikipedia.org/w/index.php?title=Joule_heating&oldid=760136650 on May 9, 2018.
Reynolds "Electrode Resistance: How Important is Surface Area" Oct. 10, 2016. p. 3 para[0001]; Figure 3; Retrieved from http://electrofishing.net/2016/10/10/electrode-resistance-how-important-is-surface-area/ on May 8, 2018.
Non-Final Office Action in U.S. Appl. No. 15/262,539, dated Jun. 1, 2018.
Non-Final Office Action in U.S. Appl. No. 14/591,476, dated Jun. 7, 2018.

(56) References Cited

OTHER PUBLICATIONS

Notice of Allowance in U.S. Appl. No. 14/591,541, dated Jun. 7, 2018.
Non-Final Office Action in U.S. Appl. No. 15/410,283, dated Jun. 7, 2018.
Notice of Allowance in U.S. Appl. No. 14/601,761, dated Jun. 19, 2018.
Co-pending U.S. Appl. No. 16/892,199, inventors Moss; John Jared et al., filed Jun. 3, 2020.
Co-pending U.S. Appl. No. 17/021,197, inventors Hardman; Ned J. et al., filed Sep. 15, 2020.
Co-pending U.S. Appl. No. 17/031,484, inventors Johnson; Peter L. et al., filed Sep. 24, 2020.
Co-pending U.S. Appl. No. 17/062,075, inventors Cardinal; Christopher J.-P. et al., filed Oct. 2, 2020.
Co-pending U.S. Appl. No. 17/072,416, inventors Taylor; Roscoe W. et al., filed Oct. 16, 2020.
Database WPI, Week 200323, 2017 Clarivate Analytics. Thomson Scientific, London, GB; Database accession No. 2003-239603, XP002781693.
EP18764428.1 Extended European Search Report dated Jan. 11, 2021.
EP18788086.9 Extended European Search Report dated Jan. 11, 2021.
Invitation to Pay Additional Fees in PCT/US2018/028619 dated Jun. 18, 2018.
Invitation to Pay Additional Fees in PCT/US2018/048378 dated Oct. 26, 2018.
Invitation to Pay Additional Fees in PCT/US2018/048381 dated Oct. 9, 2018.
Invitation to Pay Additional Fees in PCT/US2018/057401 dated Dec. 19, 2018.
Separation of Flow. (2005). Aerospace, Mechanical & Mechatronic Engg. Retrieved Jul. 16, 2020, from http://www-mdp.eng.cam.ac.uk/web/library/enginfo/aerothermal_dvd_only/aero/fprops/introvisc/node9.html.
U.S. Appl. No. 14/591,528 Office Action dated Sep. 11, 2020.
U.S. Appl. No. 15/262,539 Notice of Allowance dated Jul. 23, 2020.
U.S. Appl. No. 15/262,539 Notice of Allowance dated Jun. 18, 2020.
U.S. Appl. No. 15/410,283 Office Action dated Jul. 31, 2020.
U.S. Appl. No. 15/548,352 Office Action dated Aug. 11, 2020.
U.S. Appl. No. 16/097,035 Office Action dated Oct. 30, 2020.
U.S. Appl. No. 16/097,039 Office Action dated Nov. 18, 2020.
U.S. Appl. No. 16/180,635 Office Action dated Dec. 15, 2020.
Biscoe, et al., An X-ray study of carbon black. Journal of Applied physics, 1942; 13: 364-371.
Co-pending US patent application No. U.S. Appl. No. 16/097,035, filed Oct. 26, 2018.
Co-pending US patent application No. U.S. Appl. No. 16/563,008, filed Sep. 6, 2019.
Co-pending US patent application No. U.S. Appl. No. 16/807,550, filed Mar. 3, 2020.
Co-pending US patent application No. U.S. Appl. No. 16/855,276, filed Apr. 22, 2020.
Donnet, et al., Observation of Plasma-Treated Carbon Black Surfaces by Scanning Tunnelling Microscopy. Carbon (1994) 32(2): 199-206.
EP16845031.0 Extended European Search Report dated Mar. 18, 2019.
EP16847102.7 Extended European Search Report dated Jul. 5, 2019.
EP17790549.4 Extended European Search Report dated Nov. 26, 2019.
EP17790570.0 Extended European Search Report dated Nov. 8, 2019.
Extended European Search Report for EP Application No. 16747057.4 dated Oct. 9, 2018.
Extended European Search Report for EP Application No. 16835697.0 dated Nov. 28, 2018.
Gago, et al., Growth mechanisms and structure of fullerene-like carbon-based thin films: superelastic materials for tribological applications. Trends in Fullerene Research, Published by Nova Science Publishers, Inc. (2007): 1-46.
Hernandez, et al. Comparison of carbon nanotubes and nanodisks as percolative fillers in electrically conductive composites. Scripta Materialia 58 (2008) 69-72.
International Preliminary Report on Patentability for Application No. PCT/US2015/013482 dated Aug. 2, 2016.
International Preliminary Report on Patentability for Application No. PCT/US2015/013484 dated Aug. 2, 2016.
International Preliminary Report on Patentability for Application No. PCT/US2015/013487 dated Aug. 2, 2016.
International Preliminary Report on Patentability for Application No. PCT/US2015/013505 dated Aug. 2, 2016.
International Preliminary Report on Patentability for Application No. PCT/US2015/013510 dated Aug. 2, 2016.
International Preliminary Report on Patentability for Application No. PCT/US2017/030139 dated Oct. 30, 2018.
International Preliminary Report on Patentability for Application No. PCT/US2017/030179 dated Oct. 30, 2018.
International Search Report and Written Opinion for Application No. PCT/US2015/013487 dated Jun. 16, 2015.
International Search Report and Written Opinion for Application No. PCT/US2018/048374 dated Nov. 21, 2018.
International Search Report and Written Opinion for Application No. PCT/US2018/048378 dated Dec. 20, 2018.
International Search Report and Written Opinion for Application No. PCT/US2018/048381 dated Dec. 14, 2018.
International Search Report for Application No. PCT/US2015/13482 dated Jun. 17, 2015.
International Search Report for Application No. PCT/US2015/13487 dated Jun. 16, 2015.
Larouche, et al., Nitrogen Functionalization of Carbon Black in a Thermo-Convective Plasma Reactor. Plasma Chem Plasma Process (2011) 31: 635-647.
PCT/US2018/021627 International Search Report and Written Opinion dated May 31, 2018.
PCT/US2018/028619 International Search Report and Written Opinion dated Aug. 9, 2018.
PCT/US2018/048374 International Search Report and Written Opinion dated Nov. 21, 2018.
PCT/US2018/057401 International Search Report and Written Opinion dated Feb. 15, 2019.
PCT/US2018/064538 International Search Report and Written Opinion dated Feb. 19, 2019.
PCT/US2019/025632 International Search Report and Written Opinion dated Jun. 24, 2019.
U.S. Appl. No. 14/591,541 Notice of Allowance dated Sep. 17, 2018.
U.S. Appl. No. 14/591,528 Office Action dated Jan. 17, 2019.
U.S. Appl. No. 15/548,346 Office Action dated Oct. 22, 2019.
U.S. Appl. No. 15/548,348 Office Action dated Apr. 25, 2019.
U.S. Appl. No. 14/591,476 Notice of Allowance dated Mar. 20, 2019.
U.S. Appl. No. 14/591,528 Office Action dated Oct. 28, 2019.
U.S. Appl. No. 14/601,761 Notice of Allowance dated Feb. 9, 2018.
U.S. Appl. No. 14/601,761 Notice of Allowance dated Oct. 11, 2018.
U.S. Appl. No. 14/601,761 Notice of Allowance dated Sep. 17, 2018.
U.S. Appl. No. 15/221,088 Office Action dated Dec. 4, 2019.
U.S. Appl. No. 15/221,088 Office Action dated Mar. 7, 2019.
U.S. Appl. No. 15/229,608 Office Action dated Apr. 8, 2019.
U.S. Appl. No. 15/229,608 Office Action dated May 15, 2020.
U.S. Appl. No. 15/229,608 Office Action dated Oct. 25, 2019.
U.S. Appl. No. 15/241,771 Office Action dated Mar. 13, 2019.
U.S. Appl. No. 15/241,771 Office Action dated May 1, 2020.
U.S. Appl. No. 15/241,771 Office Action dated Sep. 25, 2019.
U.S. Appl. No. 15/259,884 Office Action dated Feb. 25, 2020.
U.S. Appl. No. 15/259,884 Office Action dated Jan. 9, 2018.
U.S. Appl. No. 15/259,884 Office Action dated May 31, 2019.
U.S. Appl. No. 15/259,884 Office Action dated Oct. 11, 2018.

(56) References Cited

OTHER PUBLICATIONS

U.S. Appl. No. 15/262,539 Office Action dated Jan. 4, 2019.
U.S. Appl. No. 15/262,539 Office Action dated Sep. 19, 2019.
U.S. Appl. No. 15/410,283 Office Action dated Jan. 16, 2020.
U.S. Appl. No. 15/410,283 Office Action dated Jun. 7, 2018.
U.S. Appl. No. 15/410,283 Office Action dated Mar. 12, 2019.
U.S. Appl. No. 15/548,346 Office Action dated May 4, 2020.
U.S. Appl. No. 15/548,348 Notice of Allowance dated Dec. 12, 2019.
U.S. Appl. No. 15/548,352 Office Action dated Jan. 31, 2020.
U.S. Appl. No. 15/548,352 Office Action dated May 9, 2019.
U.S. Appl. No. 15/548,352 Office Action dated Oct. 10, 2018.
U.S. Appl. No. 16/159,144 Office Action dated Mar. 26, 2020.
Co-pending U.S. Appl. No. 17/239,041, inventors Hardman Ned; J. et al., filed Apr. 23, 2021.
Co-pending U.S. Appl. No. 17/245,296, inventors Johnson Peter; L. et al., filed Apr. 30, 2021.
Co-pending U.S. Appl. No. 17/329,532, inventors Taylor Roscoe; W. et al., filed May 25, 2021.
Co-pending U.S. Appl. No. 17/412,913, filed Aug. 26, 2021.
Co-pending U.S. Appl. No. 17/473,106, inventors Taylor Roscoe; W. et al., filed Sep. 13, 2021.
Co-pending U.S. Appl. No. 17/487,982, filed Sep. 28, 2021.
Co-pending U.S. Appl. No. 17/498,693, inventors Johnson Peter; L. et al., filed Oct. 11, 2021.
EP18850029.2 Extended European Search Report dated Apr. 29, 2021.
EP18850502.8 Extended European Search Report dated Feb. 25, 2021.
Long C. M., et al., "Carbon black vs. black carbon and other airborne materials containing elemental carbon: Physical and chemical distinctions", Environmental Pollution, 2013, 181, pp. 271-286. https://doi.Org/10.1016/j.envpol.2013.06.009.
U.S. Appl. No. 15/229,608 Office Action dated Feb. 1, 2021.
U.S. Appl. No. 15/259,884 Office Action dated Jun. 18, 2021.
U.S. Appl. No. 15/548,346 Office Action dated Jul. 16, 2021.
U.S. Appl. No. 15/548,352 Office Action dated Sep. 21, 2021.
U.S. Appl. No. 16/097,035 Office Action dated May 10, 2021.
U.S. Appl. No. 16/097,039 Notice of Allowance dated Jun. 14, 2021.
U.S. Appl. No. 16/180,635 Notice of Allowance dated Jul. 8, 2021.
U.S. Appl. No. 16/180,635 Notice of Allowance dated Jun. 29, 2021.
U.S. Appl. No. 16/445,727 Office Action dated Aug. 17, 2021.
U.S. Appl. No. 16/855,276 Office Action dated Apr. 5, 2021.
U.S. Appl. No. 16/855,276 Office Action dated Oct. 25, 2021.
What is Carbon Black, Orion Engineered Carbons, (Year: 2015).
Carmer, et al., Formation of silicon carbide particles behind shock waves. Appl. Phys. Lett. 54 (15), Apr. 10, 1989. 1430-1432.
EP19780959.3 Extended European Search Report dated Dec. 21,2021.
Frenklach, et al., Silicon carbide and the origin of interstellar carbon grains. Nature, vol. 339; May 18, 1989: 196-198.
Gomez-Pozuelo, et al., Hydrogen production by catalytic methane decomposition over rice husk derived silica. Fuel, Dec. 15, 2021; 306: 121697.
U.S. Appl. No. 15/241,771 Office Action dated Dec. 30, 2021.
U.S. Appl. No. 16/802,190 Office Action dated Jan. 31, 2022.

* cited by examiner

PLASMA TORCH DESIGN

CROSS-REFERENCE TO RELATED APPLICATIONS

The present application claims the benefit of U.S. Provisional Application No. 61/934,184 filed Jan. 31, 2014, the disclosures of which is expressly incorporated herein by reference.

TECHNICAL FIELD

The field of art to which this invention generally pertains is methods and apparatus for making use of electrical energy to affect chemical changes.

BACKGROUND

There are many processes that can be used and have been used over the years to produce carbon black. The energy sources used to produce such carbon blacks over the years have, in large part, been closely connected to the raw materials used to convert hydrocarbon containing materials into carbon black. Residual refinery oils and natural gas have long been a resource for the production of carbon black. Energy sources have evolved over time in chemical processes such as carbon black production from simple flame, to oil furnace, to plasma, to name a few. As in all manufacturing, there is a constant search for more efficient and effective ways to produce such products. Varying flow rates and other conditions of energy sources, varying flow rates and other conditions of raw materials, increasing speed of production, increasing yields, reducing manufacturing equipment wear characteristics, etc. have all been, and continue to be, part of this search over the years.

The systems described herein meet the challenges described above, and additionally attain more efficient and effective manufacturing process.

BRIEF SUMMARY

A plasma torch is described including at least two cylindrical, graphite electrodes nested inside one another and coaxially aligned; the plasma torch described above wherein the inner electrode is hollow; the plasma torch described above where the inner electrode is a solid cylinder; the plasma torch described above useable with plasma gas which is at least about 60% $H_2$ by volume; the plasma torch described above useable with plasma gas containing at least one of CO, $C_2H_2$, HCN, $CH_4$, $C_2H_6$, $N_2$, polycyclic aromatic hydrocarbons, monoaromatic hydrocarbons, and/or Ar gas; present in at least 10 ppm (parts per million); the plasma torch described above where the gap between the concentric electrodes is not less than about 4 mm and not more than about 20 mm; the plasma torch described above containing a tip wherein the gap distance, electrode thickness, and/or surface area of the tip remains substantially constant during wear; the plasma torch described above additionally containing at least one annulus between electrodes particularly adapted for the flow of plasma gas; the plasma torch described above additionally containing an upper annulus and a lower annulus between electrodes wherein the upper annulus is wider than the lower annulus; the plasma torch described above additionally containing a power supply capable of supplying an about 300 to about 1500V operating voltage and an open circuit voltage up to about 4500V; the plasma torch described above where at least one electrode has a tip and the torch additionally contains a magnetic field generating component capable of providing a magnetic field at the tip of the electrode with an axial component of between about 10 and about 100 mT; the plasma torch described above containing an upper cathode and a lower cathode and an upper anode and a lower anode, wherein the upper cathode is connected to the lower cathode to make one electrically conductive electrode and the upper anode is connected to the lower anode to make one electrically conductive electrode and each of these connections are made at an electrically conductive electrode junction; the plasma torch described above where conical threads are used to connect upper and lower electrodes; the plasma torch described above containing an annulus between electrodes wherein the lower electrode has a more narrow annulus than the upper electrode; the plasma torch described above where the lower electrodes are considered consumable; the plasma torch described above where multiple consumable electrodes are attached to an upper electrode; the plasma torch described above containing ring thicknesses where the ring thickness of the lower electrodes is within 10% of each other; the plasma torch described above including an electrode tip area where the surface area of the electrode tip is greater than 2:3 but less than 4:1 when the surface area of the outer electrode is compared to the surface area of the inner electrode; the plasma torch described above where at least one of the electrodes has a substantially barrel stave design; the plasma torch described above where at least 5 staves are used to create a hollow concentric ring; the plasma torch described above containing axial grooves cut into the electrodes to provide relief of thermal stress and/or provide controlled thermal cracking; the plasma torch described above including an electrode tip area wherein the cylindrical electrodes comprise cylindrical rods capable of being held at the same electric potential that approximate a hollow cylinder at the tip; the plasma torch described above where the inner electrode comprises a shower head design; the plasma torch described above including an annulus for the flow of shield gas; the plasma torch described above including at least one channel for the flow of plasma gas through one or more than one of the following: an annulus, a shield gas channel, a shower head in a central electrode, through the body of hollow concentric electrodes, and/or through the center of hollow concentric electrodes; the plasma torch described above including at least one magnet to generate and tailor a magnetic field; and the plasma torch described above including a conductive mechanical connector connecting the anode to the cathode and providing a conductive path for initiation of arc.

Additional embodiments include: a plasma reactor containing a plasma chamber where the walls of the reactor include gas flow channels that can transport heat away from the plasma chamber; the plasma reactor described above where the channels are designed so as to allow at least some of the heated gas to be redirected as plasma gas; the plasma reactor described above including the torch described where the walls of the reactor narrow after the torch section to form a throat section and then the walls diverge after the throat section; the plasma reactor described above including hydrocarbon feedstock injectors in the throat section; the plasma reactor described above including hydrocarbon feedstock injectors within 5 diameters of the throat in either the upstream or downstream direction.

DETAILED DESCRIPTION

Figure 1:
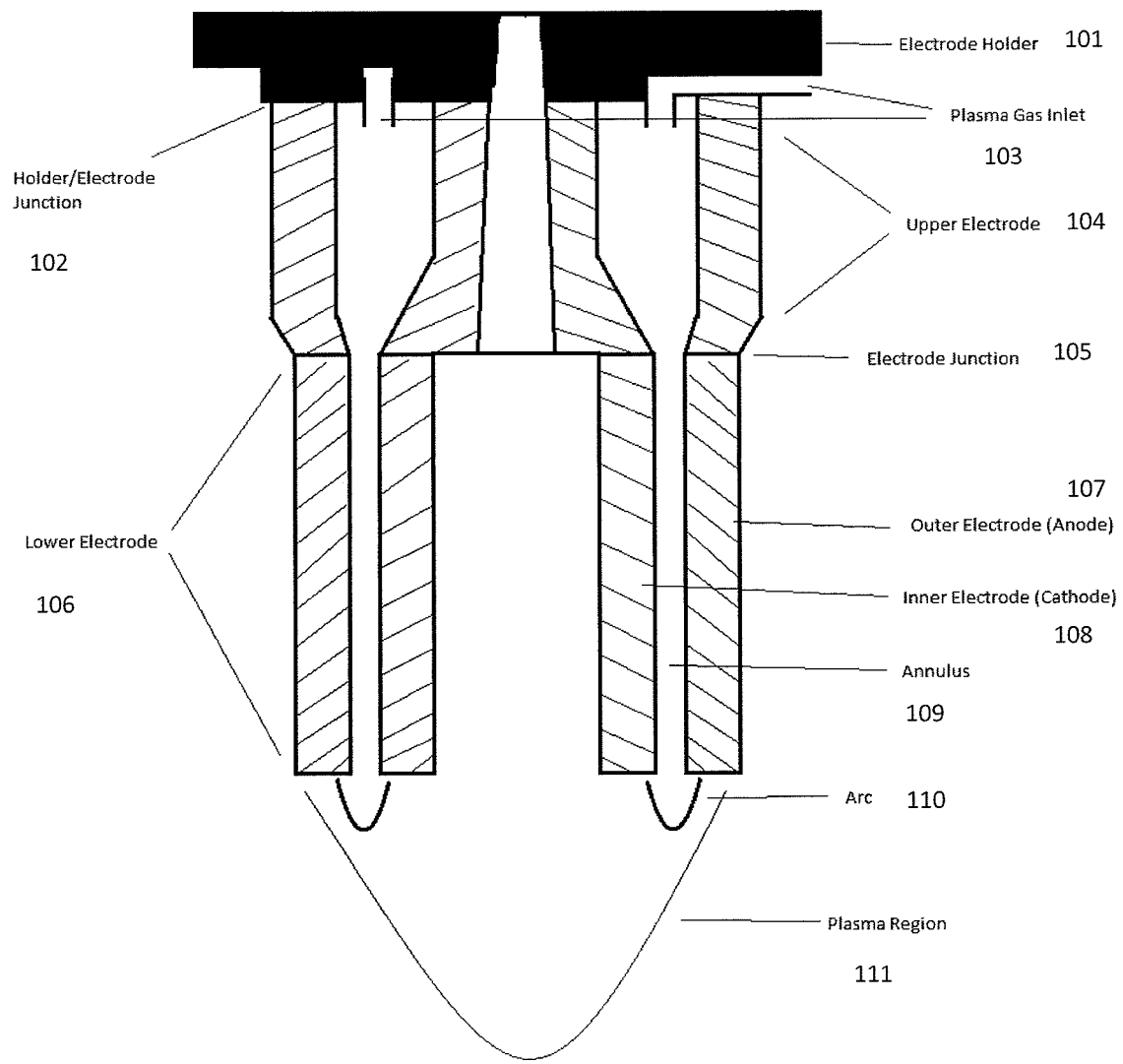
FIGS. 1, 2 and 3 show schematic representations of typical plasma torches as described herein.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Figure 2:
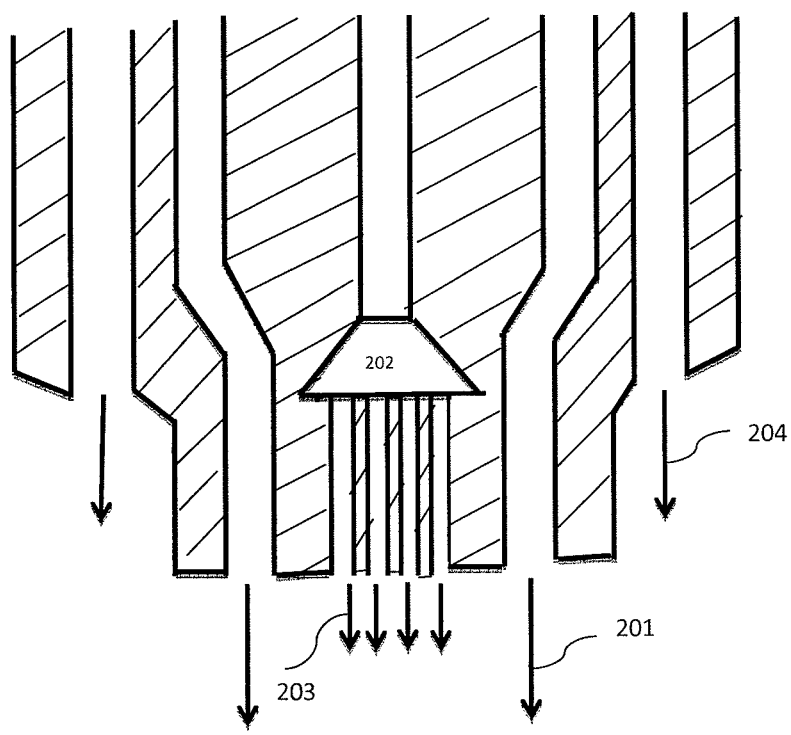
Figure 3:
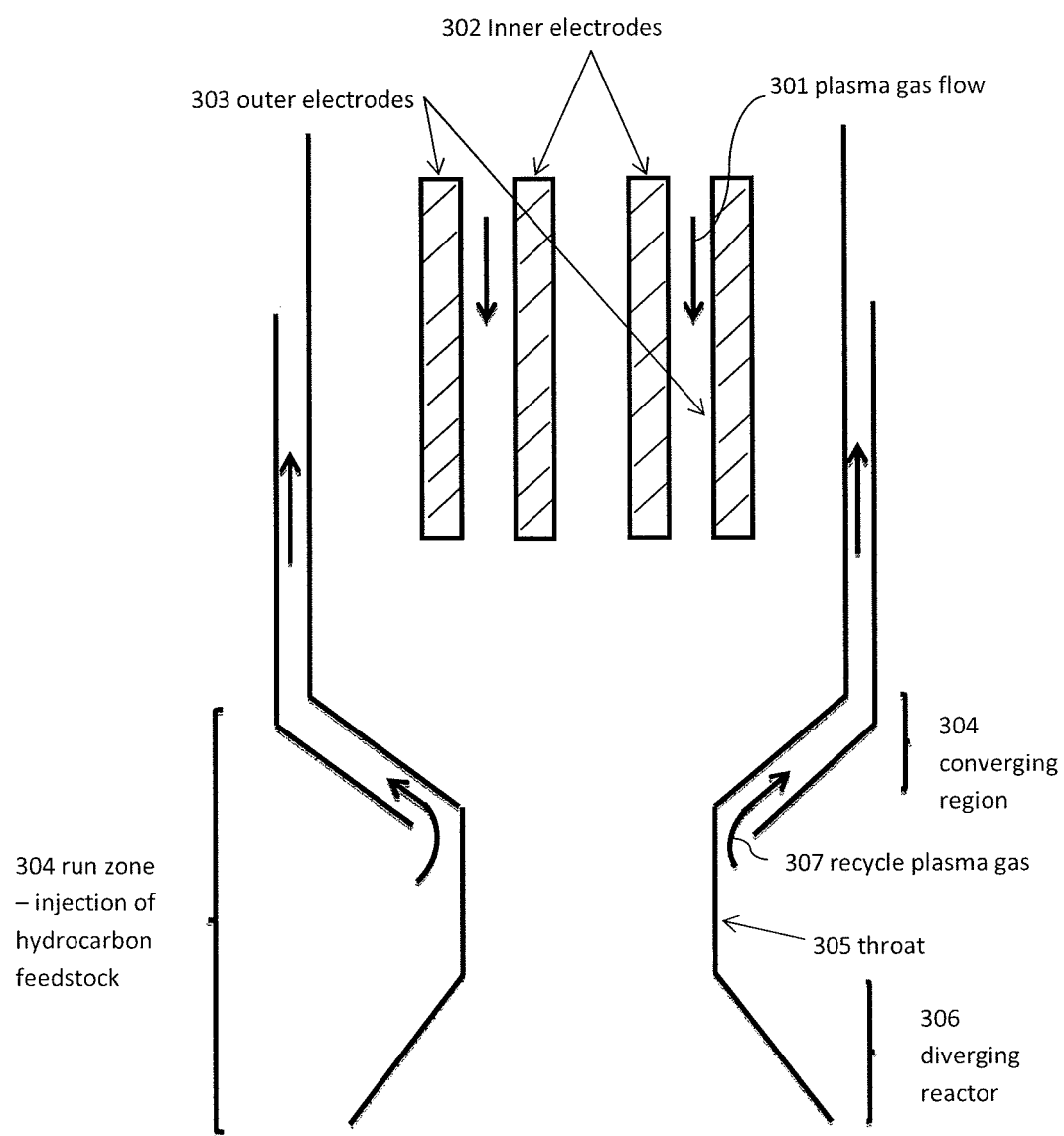

FIGS. 1, 2 and 3 are schematic 2-dimensional representations of variants of typical torches described herein. For example, FIG. 1 shows plasma gas flowing through plasma gas inlets (103) between an inner electrode (108), typically the cathode and the outer electrode (107), typically the anode. Each electrode is comprised of an upper electrode section (104) and lower electrode section (106) that are connected at the electrode junction (105). The electrode junction can use conical threads to ensure that weight distribution of the lower electrode is even across the junction and that thermally induced stress fractures are minimized. Other methods of joining the upper and lower electrodes could also be employed including hook and latch, tongue and groove, mechanical bolts, as non-limiting examples. The annulus is the space between the concentric electrodes where some but not necessarily all of the plasma gas is passed before reaching the plasma region (111). The width of the annulus is described as the average distance between the anode and cathode and the gap or the tip distance is described as the closest distance at the tip of the cathode to the tip of the anode. The electrode holders (101) are connected to the upper electrodes at the holder/electrode junction (102). The electrode holders enable the electrical isolation of both the anode and cathode and additionally supply the electrical connections to the anode and cathode. The connection of the power supply to either or both the anode and cathode can be accomplished through other means, but is convenient when accomplished with the electrode holders which serve multiple functions. The use of various materials at the electrode holders, including Teflon™ polymer and various ceramics amongst others, are included to provide adequate thermal and electrical isolation. These materials additionally allow for pre-heated plasma gas to flow in close proximity to the electrode holders which can optionally be water cooled. The plasma gas is transported through the arc (110) and serves as heat dissipation into the plasma zone or region (111) which ideally is the hottest part of the reactor. The wider upper annulus in FIG. 1 (in the upper electrode section above lower annulus 109) allows for reduced probability of arcing between the electrodes in this area of the torch. Additionally, the lower electrode is designed to be consumable in nature and allow for facile, rapid, inexpensive replacement without the need to replace the upper electrodes and the electrode holders.

FIG. 2 shows several different possible flow paths for the plasma gas. The plasma gas can flow around the outer electrode to act as a shield gas (204). This will protect the electrodes and provide for longer service life and maximize the utility of the heat load supplied by the torch. The electrodes can also have a shower head design (202) wherein the inner electrode is not a hollow ring, but rather a solid electrode with hollow shafts that allow for heat dissipation (203) at the inner electrode and maximization of the utility of the heat load of the torch. Additionally, the plasma gas can flow through the annulus (201) or it can flow through the walls of the hollow concentric inner and outer electrodes depicted in FIG. 1 for example through tubular shafts drilled axially through the electrodes.

FIG. 3 depicts the torch and the downstream reaction zone. The plasma gas (301) flows downstream of the plasma zone through the inner electrode (302) and the outer electrode (303) into a converging or narrowing region (304) and into the throat (305) and then out of the throat into a diverging reactor (306). This creates a large amount of turbulence and this configuration will provide for optimal mixing with hydrocarbon feedstock. The figure also shows recycle plasma gas (307) flowing around the lower and mid portion of the plasma zone to serve two functions (1)—cool the walls of the plasma zone and (2)—pre-heat the plasma gas prior to entering the plasma chamber to more effectively use the heat load of the plasma torch and prolong the service life of the plasma chamber.

While all of these figures show the torch/reactor in a vertical state with downward flow, it is also possible to have an upward flow, or a horizontal reactor. For the particular torch/reactor designs shown, vertical reactor orientation with downward flow is preferred.

Carbon black has been made from a variety of processes over the years, however, commercial development of a plasma based process has never been successful. In the past, plasma generator designs for the production of carbon black have not possessed adequate heating rates, resistance to corrosion, economical plasma gas, rapid mixing, and sufficient economics of manufacture to survive when pitted against the incumbent furnace process. The plasma torch described herein enable continuous operation and production of high quality carbon black from the plasma process where others have failed.

Plasma jets for various industrial processes are normally produced by plasma generators comprising a discharge chamber and mutually insulated electrodes. An electric arc discharge is initiated in the discharge chamber between the electrodes, in the flow of a medium. The medium, typically a gas, is heated in the discharge to the plasma state and flows out of the generator in the form of a plasma jet.

Of all plasma generator components, electrodes, or rather their surfaces exposed to the electric arc, "arc-spots", are exposed to the most extreme thermal flux. The thermal flux in these areas can exceed $10^5$ W/cm$^2$ (Watts per square centimeter) and this environment will melt or erode all known metals. Cooling of the plasma components is typically achieved via jacketed cooling techniques with thermal exchange agents.

In the plasma reactor described herein, the power supply, the control of arc placement, the distance between the electrodes, the gas flow rate amongst other factors are controlled with high precision to ensure performance. The power supply is connected to the electrodes and provides for very high open circuit voltage to deal with high voltage spikes. The power supply can be capable of supplying 500-1500 V (volts) or greater typical operating voltage. The power supply has an open circuit voltage that can be 1.5 to 3.0 times the operating voltage. These voltage ranges have been found to be optimal for the manufacture of carbon black at specific plasma gas flow rates in combination with hydrocarbon feedstock flow rates, a plasma gas comprised of greater than 60% hydrogen, and the gap distance of between 4 and 20 mm (millimeters).

For the given gap distance, voltage, plasma gas flow rates, and surface area of electrode tips, an optimal power density of the electrode tip is from 0.1 to 2 kW/cm$^2$ (kilowatts per square centimeter). Below this range power output would be too low for efficient carbon black production and above this range the torch would rapidly decompose resulting in inefficient carbon black production due to electrode wear.

The plasma gas is the gas that has passed through the plasma torch region and may have sufficiently interacted to be deemed in the plasma state. Plasma gas as used herein can mean the excited gas and can also mean any gas passing through the plasma torch area that could have been induced into the plasma state, but for whatever reason has not been induced.

The components of the plasma gas for the highly efficient plasma reactors described herein are comprised of at least about 60% hydrogen up to about 100% hydrogen and can further comprise up to about 30% nitrogen, up to about 30% CO, up to about 30% CH$_4$, up to about 10% HCN, up to about 30% C$_2$H$_2$, and up to about 30% Ar. Additionally, the plasma gas can also be comprised of polycyclic aromatic hydrocarbons such as anthracene, naphthalene, coronene, pyrene, chrysene, fluorene, and the like. In addition, the plasma gas can have benzene and toluene or similar monoaromatic hydrocarbon components present. A more typical composition can comprise 90% or greater hydrogen, and 0.2% nitrogen, 1.0% CO, 1.1% CH$_4$, 0.1% HCN, 0.1% C$_2$H$_2$, or thereabouts. The plasma gas can also comprise about 80% hydrogen and the remainder can comprise some mixture of the afore mentioned gases, polycyclic aromatic hydrocarbons, monoaromatic hydrocarbons, and other components.

The material of construction for the electrodes in this invention should have high thermal conductivity over 100 W/m-K (watts per meter kelvin) and electrical resistivity less than 10e-2 ohm-m (meter). Materials that fit this description include graphite and silicon carbide, although graphite is preferable. The material should be resistant to chemical erosion in highly reactive hydrogen free radical atmosphere.

The use of conical threads in joining electrodes reduces stress concentration and potential of electrode cracking can be employed. Preferable tapers comprise those with an about 1 in 3 angle can be used, although tapers down from about 1 in 2 to about 1 in 20 can also be used. To prevent the unscrewing of electrodes through vibration, a hole can be drilled through the threaded section and a pin can be inserted.

The ideal gap distance between concentric electrodes is about 4 millimeters to about 20 millimeters (mm) based on desired operating voltage, current, and electrode wear. Gap size may change operating voltage anywhere from about 500V up to about 1200V. A gap of about 8 millimeters to about 14 millimeters is the preferred gap size that provides for optimal arcing in this voltage range with minimal electrode wear, optimal thermal transfer, minimal undesired arcing, and minimal blow-out due to arc "lift-off" of the arc (loss of arc).

Additionally, the electrode length can be controlled in order to control heat distribution in the electrode. An increase in electrode length to reduce losses in water cooled holders. For instance, a preferable range for length for a 750 kW torch is between about 600 mm and about 1500 mm, wherein the 1500 mm electrode length will provide for the most gradual thermal distribution. It can be readily realized by those skilled in the art that the increased length will not only distribute heat, but also provide for more surface to allow radiative heat loss and convective heat loss from electrode to gas flowing in or around the annulus. This will, of course, be balanced against weight load requirements to gain optimal advantage of both heat management and electrode integrity (reduction of cracks, etc.)

Additional methods to control or optimize weight load vs. thermal stress is to make the concentric rings out of cylindrical electrodes with touching tips that allow for the passage of electricity through concentric tubes that still allow for an annulus between the anode and cathode. The electrodes in this type of embodiment could also be rectangular in nature with groove and tongue type connections to allow for electrical conductivity and weight load support.

Figure 5:
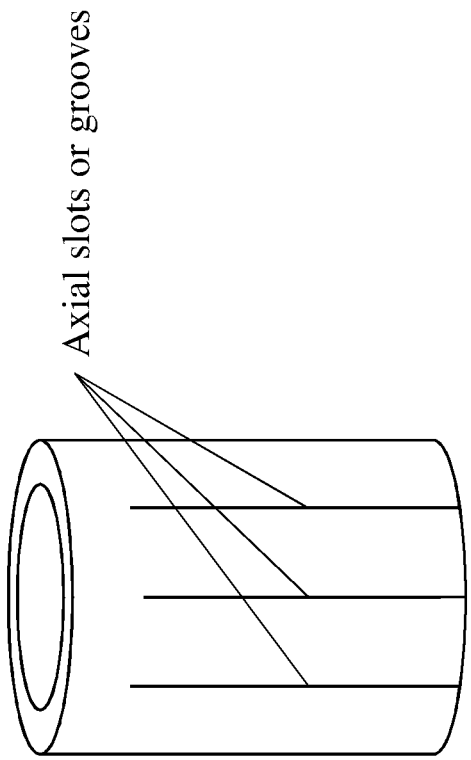
FIG. 5 shows a schematic representation of axial slots or grooves cut into an electrode.
Figure 4:
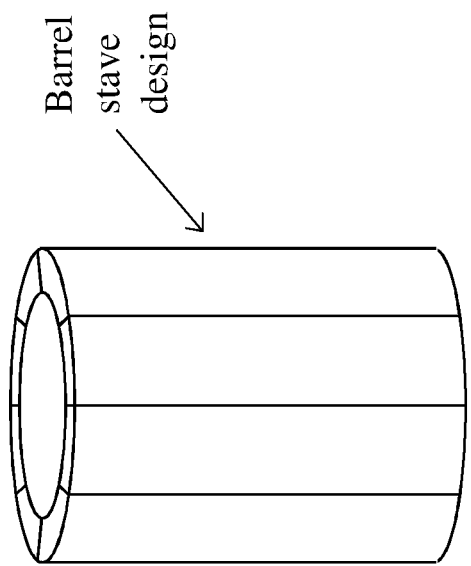
FIG. 4 shows a schematic representation of an electrode that has a substantially barrel stave design.

To address thermal stress cracking in very large diameter hollow cylindrical electrodes, use of a barrel stave design where the sections are held together with features commonly employed in such a design which allows different sections to flex based on thermal gradient, or the use of a solid piece of material that has axial slots cut into it to relieve thermal stress. The axial slots can be referred to as the barrel stave design. In the barrel stave design, at least 5 staves or sections would be required to create the concentric ring or barrel. FIG. 4 shows a schematic representation of an electrode that has a substantially barrel stave design. FIG. 5 shows a schematic representation of axial slots or grooves cut into an electrode.

Another alternative would be the use of distinct pieces to simulate a cylinder, for example a ring of solid rods. This configuration also possesses advantages in material availability and ease of replacement.

Elongating the life of the electrodes is largely dependent on the ability to minimize the thermal effect of the electric arc on the electrodes, as well as adequate protection of the electrode surface against the erosive medium. This can partially be achieved by applying an electromagnetic field to reduce the effects of the arc spots by moving the arc spots rapidly over the electrode surface, whereby the mean thermal flux is reduced in density to the areas of contact between the electrodes and electric arc. The magnetic field is provided for through the use of an annular magnetic coil located outside of the electrodes. The field can also be provided for by the use of a permanent magnet as long as the field is oriented in such a way that the arc is rotated around the central axis of the torch which facilitates the rotation of the arc around said axis.

Additionally, the magnetic field will push the plasma outside of the confines of the immediate space between the two electrodes. This means that the erosive medium (superheated $H_2$ and hydrogen radical) will be largely separated from the electrode itself. In one embodiment, the method includes the use of a rotating arc discharge created through the application of a magnetic field to the electrodes, as measured at the annulus at the tip of the torch, of about 20 millitesla (mT) to about 100 millitesla, measured in the axial direction, hereafter referred to as axial component. A value of about 30 millitesla to about 50 millitesla can typically be used. The typical radial component of the magnetic field can be between about 3 and about 15 mT.

One or more magnetic coils can be employed to tailor the shape of the field used to manipulate the behavior of the arc. For example, a coil design may produce a diverging magnetic field with a 6 mT radial component and a 40 mT axial component at the tip of the torch. It is not possible to change one of these without the other using one coil, however, through the utilization of several coils the arc can be tailored to a specific radial and axial component. This may further reduce the capital cost of the magnetic coil and optimize the shape of the magnetic field to maximize the life of the electrode.

As mentioned previously, the electrodes can be made up of upper and lower portions wherein the lower portion can be made to be replaced in an extremely rapid fashion with low cost graphite parts. The definition of consumable in this context means that more than 1 ton of carbon black but less than 100 tons of carbon black is produced per inch of axially oriented graphite erosion. Additionally, multiple consumable electrodes can be attached to the upper electrode e.g. 3 or 4 or more consumable electrodes that are removed or allowed to be consumed in place during carbon black production runs. This enables limited downtime of the torch and provides a sacrificial electrode that is both cheap and rapidly replaced.

Use of different gas flow paths to affect the cooling of electrodes and change the flow profile in the arc region are shown, for example, in FIG. 2. Gas can pass through the annulus (default flow path), through an inner path (201) consisting of hole(s) drilled into the center electrode, through the hollow path inside the inner electrode, or through an outer path (204) around the outer electrode (referred to as shield gas). In FIG. 2 this outer path is through a ring of holes in the upper electrode, but this flow entrance could also be an annular slot. The inner and outer flow paths help to cool the electrodes and transfer more heat to the gas. They also allow higher gas flow rates that might "blow out" the arc if directed entirely through the annulus. And the outer flow path acts as a shielding gas, helping to confine the plasma region and protect surrounding refractory. A typical flow split could be about 50% through the annulus and about 25% through each of the other two paths. Any combination of flow splits could be used to achieve different operating regimes and optimize for different goals (e.g. reducing wear, increasing operating voltage, etc.).

Of further interest is the utilization of mechanical means of establishing electrical contact between the electrodes and initiating an arc. This eliminates the need for a high voltage starter and associated equipment and safety risks. This may consist of a moving rod made from an electrically conductive material such as graphite or copper that would touch the electrodes simultaneously, allowing current to flow, before being withdrawn. The starter rod could be a plunger that comes in through the outer electrode and strikes the arc in the annulus or it could be a rotating arm that strikes the arc at the electrode tips.

As described herein, the reactor is separated into two sections or zones, a plasma zone and a reactor zone, with natural gas or other feedstock injection taking place in the area in-between. The throat is used not only to separate the two regions but to accelerate the plasma gas so that more intense mixing can take place in a smaller region. The throat is therefore defined as the narrowest section between the plasma zone and the reactor zone. The length of the throat can be several meters or as small as about 0.5 to about 2 millimeters. The narrowest point of the throat is defined as the most narrow diameter of the throat +20%. Any cross-section that is within about 10% of the most narrow cross-section is deemed to be within the scope of the throat.

Preferable injection points into the reactor are about 5 diameters upstream of the throat and about 5 diameters downstream of the throat. One diameter is defined as the diameter of the throat at the most narrow point of the throat. Optionally the injection can occur within about +/−2 diameters or about +/−1 diameter of the throat.

Acceptable hydrocarbon feedstock includes any chemical with formula $C_nH_x$ or $C_nH_xO_y$. For example simple hydrocarbons such as: methane, ethane, propane, butane, etc. can be used. Aromatic feedstock such as benzene, toluene, methyl naphthalene, pyrolysis fuel oil, coal tar, coal, heavy oil, oil, bio-oil, bio-diesel, other biologically derived hydrocarbons, or the like. Also, unsaturated hydrodcarbon feedstocks can also be used, such as: ethylene, acetylene, butadiene, styrene and the like. Oxygenated hydrocarbons such as; ethanol, methanol, propanol, phenol, and similar are also acceptable feedstocks. These examples are provided as non-limiting examples of acceptable hydrocarbon feedstocks which can further be combined and/or mixed with other acceptable components for manufacture. Hydrocarbon feedstock referred to herein, means that the majority of the feedstock is hydrocarbon in nature.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A plasma torch, comprising at least two cylindrical, graphite electrodes comprising an inner electrode nested within an outer electrode, wherein the inner electrode is coaxially aligned with the outer electrode, and wherein at least one of the electrodes comprises a barrel stave design comprising staves or sections that form a ring or barrel such that the at least one of the electrodes is configured to (i) provide relief of thermal stress or (ii) provide controlled thermal cracking.

2. The plasma torch of claim 1, wherein the inner electrode is hollow.

3. The plasma torch of claim 1, wherein the inner electrode is a solid cylinder.

4. The plasma torch of claim 1, wherein a gap between the electrodes is not less than about 4 millimeters (mm) and not more than about 20 mm.

5. The plasma torch of claim 1, wherein the electrodes are configured such that a gap distance between the electrodes, an electrode thickness of at least one of the electrodes, and/or a surface area of a tip of at least one of the electrodes remains constant during wear.

6. The plasma torch of claim 1, further comprising at least one annulus between the electrodes adapted for a flow of plasma gas.

7. The plasma torch of claim 1, further comprising an upper annulus and a lower annulus between the electrodes, wherein the upper annulus is wider than the lower annulus.

8. The plasma torch of claim 1, further comprising a power supply configured to supply about 300 volts (V) to about 1500V operating voltage and an open circuit voltage up to about 4500V.

9. The plasma torch of claim 1, wherein at least one of the electrodes has a tip, and wherein the plasma torch additionally comprises a magnetic field generating component configured to provide a magnetic field at the tip of the at least one electrode with an axial component of between about 10 millitesla (mT) and about 100 mT.

10. The plasma torch of claim 1, wherein at least portions of the electrodes are replaceable.

11. The plasma torch of claim 10, wherein each electrode of the electrodes comprises an upper electrode and a lower electrode section, wherein the lower electrode section is replaceable, and wherein multiple replaceable lower electrode sections are attached to the upper electrode section.

12. The plasma torch of claim 1, wherein a surface area of a tip of the outer electrode is greater than 2:3 but less than 4:1 compared to a surface area of a tip of the inner electrode.

13. The plasma torch of claim 1, further comprising an annulus disposed around the outer electrode of the electrodes for a flow of shield gas.

14. The plasma torch of claim 1, further comprising at least one channel for flow of plasma gas through one or more of the following: an annulus disposed between the electrodes, a shield gas channel disposed around the outer electrode, a shower head in the inner electrode, a body of at least one hollow electrode of the electrodes, and a center of at least one hollow electrode of the electrodes.

15. The plasma torch of claim 1, further comprising at least one magnet disposed outside of the electrodes configured to generate and tailor a magnetic field.

16. A plasma reactor including the plasma torch of claim 1, wherein the plasma reactor comprises walls, and wherein the walls of the plasma reactor narrow after the plasma torch to form a throat and diverge after the throat.

17. The plasma torch of claim 1, wherein the barrel stave design comprises at least 5 staves.

18. The plasma torch of claim 17, wherein the at least 5 staves form the ring.

* * * * *